United States Patent
Maalouf et al.

(10) Patent No.: US 10,775,894 B2
(45) Date of Patent: Sep. 15, 2020

(54) SYSTEMS AND METHODS FOR PROVIDING CUSTOMIZABLE HAPTIC PLAYBACK

(71) Applicant: Immersion Corporation, San Jose, CA (US)

(72) Inventors: Johnny Maalouf, Laval (CA); Jamal Saboune, Montreal (CA)

(73) Assignee: Immersion Corporation, San Francisco, CA (US)

( * ) Notice: Subject to any disclaimer, the term of this patent is extended or adjusted under 35 U.S.C. 154(b) by 0 days.

(21) Appl. No.: 16/178,664

(22) Filed: Nov. 2, 2018

(65) Prior Publication Data

US 2020/0142484 A1    May 7, 2020

(51) Int. Cl.
  *G06F 3/01* (2006.01)
  *G06N 5/04* (2006.01)
  *G06N 20/00* (2019.01)
  *G06F 3/041* (2006.01)

(52) U.S. Cl.
  CPC .............. *G06F 3/016* (2013.01); *G06F 3/013* (2013.01); *G06F 3/0414* (2013.01); *G06N 5/04* (2013.01); *G06N 20/00* (2019.01)

(58) Field of Classification Search
  CPC combination set(s) only.
  See application file for complete search history.

(56) References Cited

U.S. PATENT DOCUMENTS

| | | | | |
|---|---|---|---|---|
| 2013/0113715 | A1* | 5/2013 | Grant | G06F 3/0488 345/173 |
| 2014/0256438 | A1* | 9/2014 | Grant | A63F 13/10 463/36 |
| 2014/0333625 | A1 | 11/2014 | Itkowitz et al. | |
| 2014/0362014 | A1 | 12/2014 | Ullrich et al. | |
| 2015/0185841 | A1* | 7/2015 | Levesque | G06F 1/1639 715/702 |
| 2016/0085303 | A1* | 3/2016 | Israr | H04N 21/426 340/407.2 |
| 2018/0181201 | A1 | 6/2018 | Grant et al. | |

FOREIGN PATENT DOCUMENTS

| | | |
|---|---|---|
| EP | 2778848 | 9/2014 |
| EP | 3179336 | 6/2017 |

OTHER PUBLICATIONS

European Application No. EP19206964.9 , "Office Action", dated Mar. 10, 2020, 15 pages.

* cited by examiner

*Primary Examiner* — Deeprose Subedi
(74) *Attorney, Agent, or Firm* — Kilpatrick Townsend & Stockton LLP

(57) ABSTRACT

One illustrative system disclosed herein includes a computing device that comprises a memory and a processor in communication with the memory. The processor can generate content that can be provided to a user. The processor can obtain data indicating various haptic tracks associated with various content elements in the content. The processor can determine a selection of a haptic track of the various haptic tracks associated with a particular content element of the various content elements. The processor can determine a characteristic of the haptic track and then transmit a haptic signal associated with the haptic track to a haptic output device, which can receive the haptic signal and output the haptic track.

23 Claims, 5 Drawing Sheets

SYSTEMS AND METHODS FOR PROVIDING CUSTOMIZABLE HAPTIC PLAYBACK

FIELD

The present disclosure relates generally to user interface devices. More specifically, but not by way of limitation, this disclosure relates to systems and methods for providing customizable haptic playback.

BACKGROUND

Display devices can be used to provide content, such as videos or a simulated environment (e.g., a virtual or an augmented reality environment). Many modern user interface devices can be used to provide haptic feedback to the user as the content is provided to the user or as the user interacts with the content.

Many user interface devices or feedback systems, however, may lack the capability of providing haptic feedback that corresponds to content that is relevant to the user.

SUMMARY

Various embodiments of the present disclosure provide systems and methods for providing customizable haptic playback. One example system includes a non-transitory computer-readable medium; and a processor communicatively coupled to the non-transitory computer-readable medium, wherein the processor is configured to execute processor-executable instructions stored in the non-transitory computer-readable medium to obtain content to be provided to a user; obtain data identifying a plurality of haptic tracks associated with a plurality of content elements of the content; determine a selection of a content element of the plurality of content elements; identify a haptic track of the plurality of haptic tracks, the haptic track associated with the selected content element; determine a haptic effect based on the haptic track; transmit a content signal based on the content to an output device, the output device configured output at least a portion of the content; and transmit a haptic signal to a haptic output device, the haptic signal configured to cause the haptic output device to output the haptic effect corresponding to the at least a portion of the content.

One example method includes obtaining content to be provided to a user; obtaining data identifying a plurality of haptic tracks associated with a plurality of content elements of the content; determining a selection of a content element of the plurality of content elements; identifying a haptic track of the plurality of haptic tracks, the haptic track associated with the selected content element; determining a haptic effect based on the haptic track; determining a characteristic of the haptic effect; transmitting a content signal based on the content to an output device, the output device configured output at least a portion of the content; and transmitting a haptic signal to a haptic output device, the haptic signal configured to cause the haptic output device to output the haptic effect based on the characteristic and corresponding to the at least a portion of the content.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
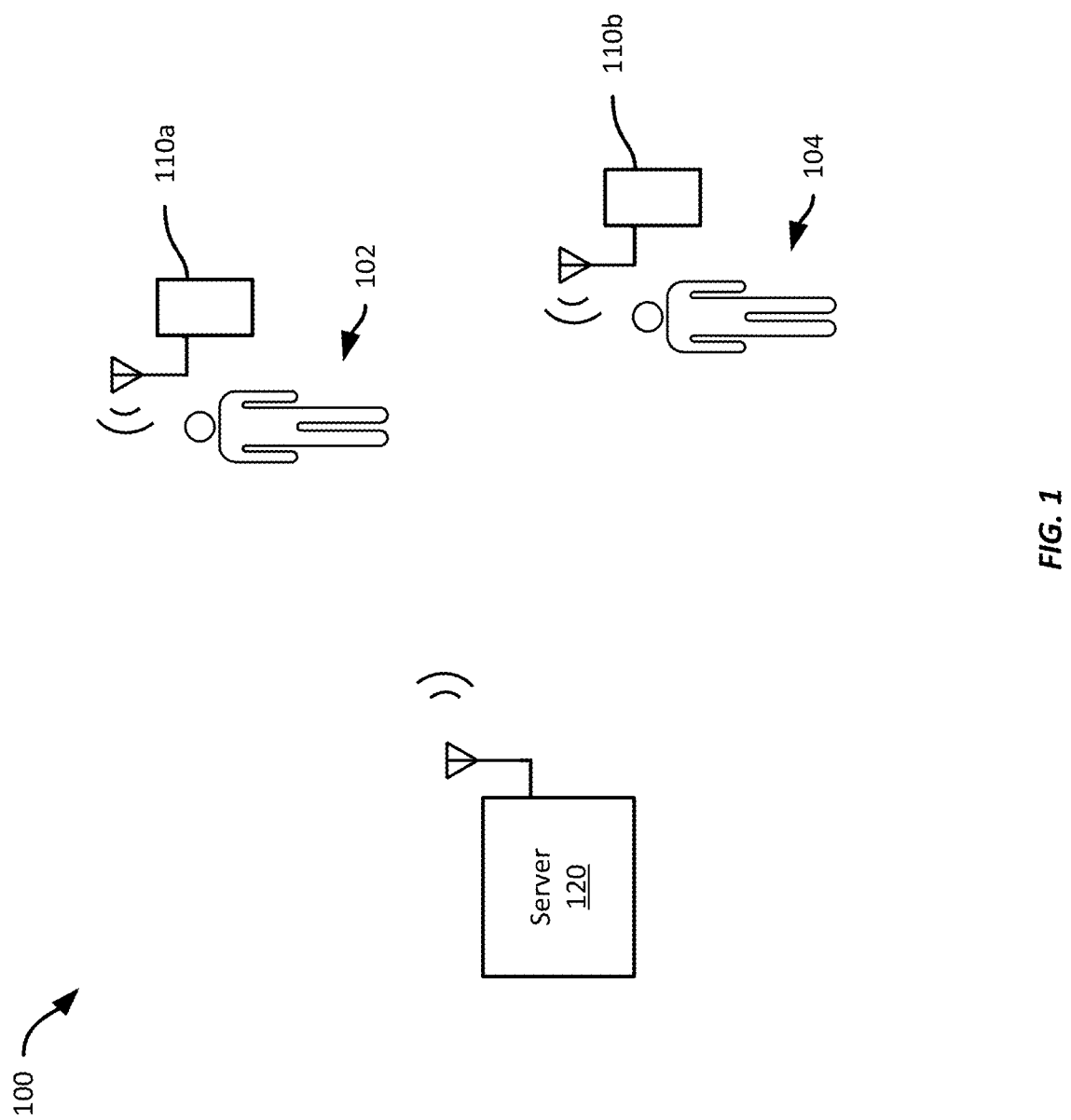
FIGS. 1-2 show example systems for providing customizable haptic playback.

Examples are described herein in the context of systems and methods for providing customizable haptic playback. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In the context of a virtual reality ("VR") or augmented reality ("AR") environment (both of which are types of "simulated reality" or "SR"), a user may watch prerecorded events, akin to simulated reality movie, play video games, explore real-world environments without the need to travel, or any of myriad uses. An immersive SR environment may include haptic effects to provide tactile sensations related to objects or events within the SR environment. However, such haptic effects may stem from many different occurrences, but a user may wish to focus on something specific, such as a specific character in the environment. Thus, an example SR environment may allow the user select items or events of interest and focus the SR-provided haptic effects on the haptics related to those items. The SR system may then prioritize or emphasize haptic effects associated with those items, or may filter out haptic effects that are unrelated to those items.

These sets of haptic effects, which may also be referred to as "haptic tracks," may thus be selectively enabled, disabled, emphasized, deemphasized, or otherwise prioritized for the user. The haptic tracks to prioritize may be based on the user's explicit selection of an object, character, etc., or even the haptic track (or tracks) of interest themselves. Alternatively, they may be selected based on the user's apparent focus on a particular object via gaze tracking, inferred from user input into the SR environment, such as by aiming a weapon, or by detecting an audible cue about the content, such as the user expressing a like for a particular character in a movie or laughing at a scene in a SR environment.

To provide such functionality, one illustrative embodiment includes a computing device that can generate and output content (e.g., a virtual or augmented reality environment, a video, a user interface, etc.). The memory of the computing device can include a database that includes data corresponding to various haptic tracks associated with characters, objects, events, etc. A haptic track can include a haptic effect (e.g., a vibration) or a series of haptic effects that correspond to the events occurring in the content being provided.

For example, if a video includes a series of explosions, the haptic track(s) can be a series of vibrations that correspond to each explosion. In this example, the user can provide user input to indicate a particular character, object, event, etc. of interest or a haptic track of interest that the user wants to perceive. For instance, if the video includes a first character and a second character, the first character can be associated with a first haptic track and the second character can be associated with a second haptic track and the user can provide user input (e.g., by selecting a particular haptic effect or character via a graphical user interface, by looking at a particular character or data about a haptic track, moving near a character, object, etc.) indicating a selection of the first haptic track. In this example, the user can also provide user input to mute the second haptic track.

In this illustrative example, the processor of the computing device can also automatically select a particular character, object, event, etc. of interest or a haptic track of interest for the user. As an example, if the content includes a SR environment that includes a first character associated with a first haptic track and a second character associated with a second haptic track, the processor can select a haptic track based on a virtual distance between the user and the first or second character or a field of view or a direction of an eye gaze of the user. For instance, as the user interacts with the SR environment, if the user is closer (within the SR environment or "virtually closer") to the second character as compared to the first character, the processor can automatically select the second haptic track associated with the second character. As another example, the computing device can include a display device with a sensor for detecting the user's field of view with respect to content provided to the user. The sensor can transmit a signal to the processor, which determines that the user's eye gaze is more focused on the first character as compared to the second character. In this example, the processor can automatically select the first haptic track associated with the first character in response to determining that the user is more focused on the first character.

Continuing with the illustrative embodiment, the user can provide user input to modify the selected haptic track of interest. As an example, the user can provide user input to modify a characteristic (e.g., an intensity, frequency, type of haptic output device to use to output the haptic track, etc.) of the selected haptic track or a haptic effect of the haptic track. As an example, the computing device can include a touch sensitive surface via which the user can provide user input (e.g., by touching the touch sensitive surface). The touch sensitive surface can include a pressure sensor that detects an amount of pressure of the user's contact with the touch sensitive surface. For instance, the processor can modify the haptic track to increase a vibration intensity in response to determining that the amount of pressure of the user's contact is above a threshold, indicating the user's intention to increase the magnitude of the vibration, or conversely, reducing an intensity of the vibration based on an applied pressure below the same or a different threshold, indicating a desire to reduce the vibration intensity.

In another example, the processor can determine or modify a characteristic of the selected haptic track based on a detected user motion. For example, the user can be holding or wearing a user device that includes a sensor for detecting or sensing a motion (e.g., a gesture) by the user and the user's motion can be used to modify a characteristic of the haptic effect. For instance, the user can raise a hand (e.g., the hand on which the user is wearing the user device or in which the user is holding the user device) and the sensor of the user device can detect the user's motion. In this example, the sensor can transmit one or more signals indicating the detected motion to the processor, which can then determine or modify a characteristic of the selected haptic track based on the detected motion such as, for example, by increasing a magnitude of the haptic track in response to determining that the user is raising the hand, or deemphasizing it if the user lowers his hand.

As another example, the processor can determine or modify a characteristic of the selected haptic track based on a field of view or a direction of an eye gaze of the user. For example, the computing device can include a display device with a sensor for detecting the user's gaze direction with respect to content provided to the user. The sensor can transmit a signal to the processor, which determines that the user's eye gaze is focused on the first character associated with the selected first haptic track. In this example, the processor can determine that the haptic track includes one or more strong vibrations in response to determining that the user is focused on the first character.

As still another example, if the content includes a simulated reality environment, the processor can determine or modify a characteristic of the selected haptic track based on a virtual distance between the user and the first character associated with the selected first haptic track. For instance, as the user interacts with the simulated reality environment, if the user is close to the first character, the processor can determine that the haptic track for the first character has increased magnitude vibrations in response to determining that the user is close to the first character.

In some examples, the processor can train a machine learning technique to predict a haptic track that can be selected by the user or a characteristic of a selectable haptic track based on historical or real-time data about the user's selection of one or more haptic tracks or a characteristic of the haptic track. For instance, the processor can train a machine-learning algorithm to predict or recommend selecting one or more haptic tracks that are similar to a haptic track selected by the user.

In the illustrative embodiment, the processor can transmit a haptic signal associated with the selected haptic track to a haptic output device (e.g., a haptic output device of the computing device or a haptic output device of a user device associated with the user). The haptic output device is configured to receive the haptic signal from the processor and output the selected haptic track based on the haptic signal. In the illustrative embodiment, the haptic track can include haptic effects that correspond to one or more events relevant to the content of interest to the user. As an example, if the user selects the first haptic track associated with the first character, the haptic output device can output the first haptic track, which can allow the user to perceive haptic effects associated with the first character. Thus, for example, the user can customize haptic playback to be relevant to a particular character, object, event, etc. of interest or a haptic track of interest that the user wants to perceive.

This illustrative example is given to introduce the reader to the general subject matter discussed herein and the disclosure is not limited to this example. The following sections describe various additional non-limiting examples and examples of systems and methods for providing customizable haptic playback.

Referring now to FIG. 1, FIG. 1 is a block diagram showing a system for providing customizable haptic playback according to one embodiment. The example system includes two user devices 110a-b that are in wireless communication with a server 120. In this example, the user devices 110a-b are computing devices that receive content from the server 120 and provide it to their respective user 102, 104. Content may be any suitable form of content that can be output by an output device to a user, including audio, video (including panoramic, pannable, or 360-degree video content), gaming content, movies, text, a SR environment, etc. "Pannable" video content refers to video content that a user may view from different vantage points, such as by moving their viewing device (e.g., a smartphone) through different orientations and positions. Such changes in orientation or position result in a change in viewpoint within the video and may enable to view different aspects of scenes within the video content. Further, content may have one or more associated haptic tracks. Each haptic track may be associated with the content itself or with one or more content elements within the content, and may be identified for output as will be discussed in more detail below.

Haptic tracks relate generally to haptic information associated with a content item, which may include content features themselves, such as movies, television ("TV") shows, video games, etc., or with one or more aspects of a content feature. A haptic track for a content feature may include one or more haptic effects described in or referenced by a file or metadata associated with the content feature. For example, a 360-degree movie may have one or more tracks of video information, one or more tracks of audio information, and one or more tracks of haptic information. A haptic track thus may be separate from content-specific tracks, but may include information associating haptic information within the haptic track with portions of the audio or video tracks. For example, a haptic track may include a timeline along with haptic effects are positioned. As the audio and video tracks are output, the haptic track is "played" as well and, when a haptic effect is reached, the haptic effect is output, potentially synchronized with an audio or video event.

In some examples, however, a haptic track may include haptic information and associated labels. The audio or video tracks may then include metadata identifying labels within the haptic track. Thus, as the audio and video tracks are output, when metadata is encountered referencing a label in the haptic track, a corresponding haptic effect may be output based on the haptic information.

Alternatively, the haptic track(s) may include metadata tags that identify labels within the audio or video tracks. For example, the audio or video tracks may include labels identifying scenes or events, and as the audio and video tracks are output, the labels may be encountered. The content player may then identify haptic effects associated with the labels in the audio or video tracks and output the haptic effects. Such a technique may enable haptic tracks to be created and associated with existing content that was not initially haptified, but that does include information identifying contextual information about the content. For example, streaming content may include a wide variety of metadata, including identifying on-screen actors, scenes, names of musical pieces, on-screen events, etc., that may be used to synchronize with haptic effects added onto the content via one or more haptic tracks.

It should be appreciated that while haptic tracks above have been described as including haptic information about multiple haptic effects, a haptic track may include only a single haptic effect, or may only reference haptic effects that are stored at another location, such as within a haptic library or stored remotely at a server.

Referring again to FIG. 1, in this example, the user devices 110a-b are each a SR headset that includes a display, headphones with speakers, sensors that can be used to detect the position of the SR headset as well as movement of the SR headset, and a haptic output device. The sensors may include one or more of an accelerometer, a gyroscope, a wireless radio frequency ("RF") receiver, one or more light detectors (e.g., a photodiode), a camera, and ultrasound transducer, etc. In some examples, the user devices 110a-b may include one or more transmitters that may be detected by sensors external to the user device. Suitable transmitters include RF transmitters, light emitters (e.g., light-emitting diodes), etc.

As the users interact with the SR environment provided by the server 120, they may encounter objects or perceive events within the environment. For example, a user 102, 104 may encounter virtual non-player characters, such as enemies, vendors, etc., or may view events such as lightning, rain, explosions, etc. One or more of these content elements may have an associated haptic track that can be output by the haptic output device in the respective SR headset. The haptic tracks may specify one or more haptic effects, which may simulate rainfall or impacts, or may provide information, such as proximity to a character of importance, etc. In some cases, the user may desire to focus her attention on something within the environment, such as vendor, which may cause the server to customize the haptic effects provided to the user.

For example, the user 102, 104 may turn her head or body so that the SR headset is oriented in the apparent direction of the vendor within the SR environment. The user 102, 104 may then look at the vendor. The server 120 may detect that the user is looking at the vendor, such as by employing gaze tracking techniques, either alone or in conjunction with determining the orientation of the SR headset. Upon determining that the user's gaze is on the vendor, the server 120 may then detect that the user 102, 104 begins moving towards the vendor, which the server 120 uses to infer that the user 102, 104 is focused on the vendor. The server may then select the vendor as a content element being focused on by the user, and identify a haptic track associated with the vendor. The server 120 may then adjust a characteristic of the haptic effect, e.g., a magnitude, a frequency, a duration, etc.

For example, the server 120 may adjust the characteristic based on the user or the vendor, such as based on the distance between them in the SR environment, whether the vendor is friendly or hostile, etc., based on an in-game event or condition, such as an urgent need for food or water, etc. The server 120 may then transmit the adjusted haptic track to the SR headset as well as a stream of content signals to enable the SR headset to output both the content and the corresponding haptic track. This may then continue continuously until the user changes focus or otherwise de-selects the vendor.

In addition to selecting the content element and identifying a corresponding haptic track, the server 120 may also de-emphasize or disable other haptic effects that might otherwise be output to enable the user to receive the haptic effects associated with the vendor or other content element the server 120 detects the user is focused on. Alternatively, the user may select particular content elements of interest, such as by explicitly selecting an object in a simulated reality environment, or implicitly selecting content elements of interest, such as by selecting an active quest or entering a particular play mode such as stealth or combat. Using such selections, the server 120 may then customize haptic tracks to emphasize those associated with the content elements of interest, while deemphasizing, or disabling, haptic tracks for other content elements.

Emphasizing a haptic track may involve adjusting a characteristic of the haptic track, such as by increasing its intensity (i.e., its magnitude), increasing its duration or repeat rate, etc. Conversely, a haptic track may be de-emphasized by reducing its intensity, duration, or repeat rate, or by entirely disabling some or all haptic tracks other than those to be emphasized. The server 120 may determine whether to de-emphasize or disable such haptic tracks based on the user context. For example, if the user is entering combat, the system may deemphasize haptic tracks associated with user interface components, but still output them as they may provide useful information to the user, but it may disable haptic tracks associated with environmental conditions. Still other permutations of haptic tracks to emphasize or deemphasize may be employed.

While the example system shown in FIG. 1 is described with respect to a SR environment, haptic tracks may be provided with other kinds of content, such as movies or other video content. In such cases, the user may select one or more characters of interest or scenes of interest, which may cause the server to emphasize haptic tracks associated with the selected character, or with the selected scenes or similar scenes provided in the future. Further examples will be described in more detail below.

In addition, while the system 100 shown in FIG. 1 shows two users 102, 104 participating in a SR environment at a common location, it should be appreciated that example systems according to this disclosure may accommodate any suitable number of users, from only one user to any number of users limited only by the computing resources provided by the server 120 (or multiple servers).

Figure 2:
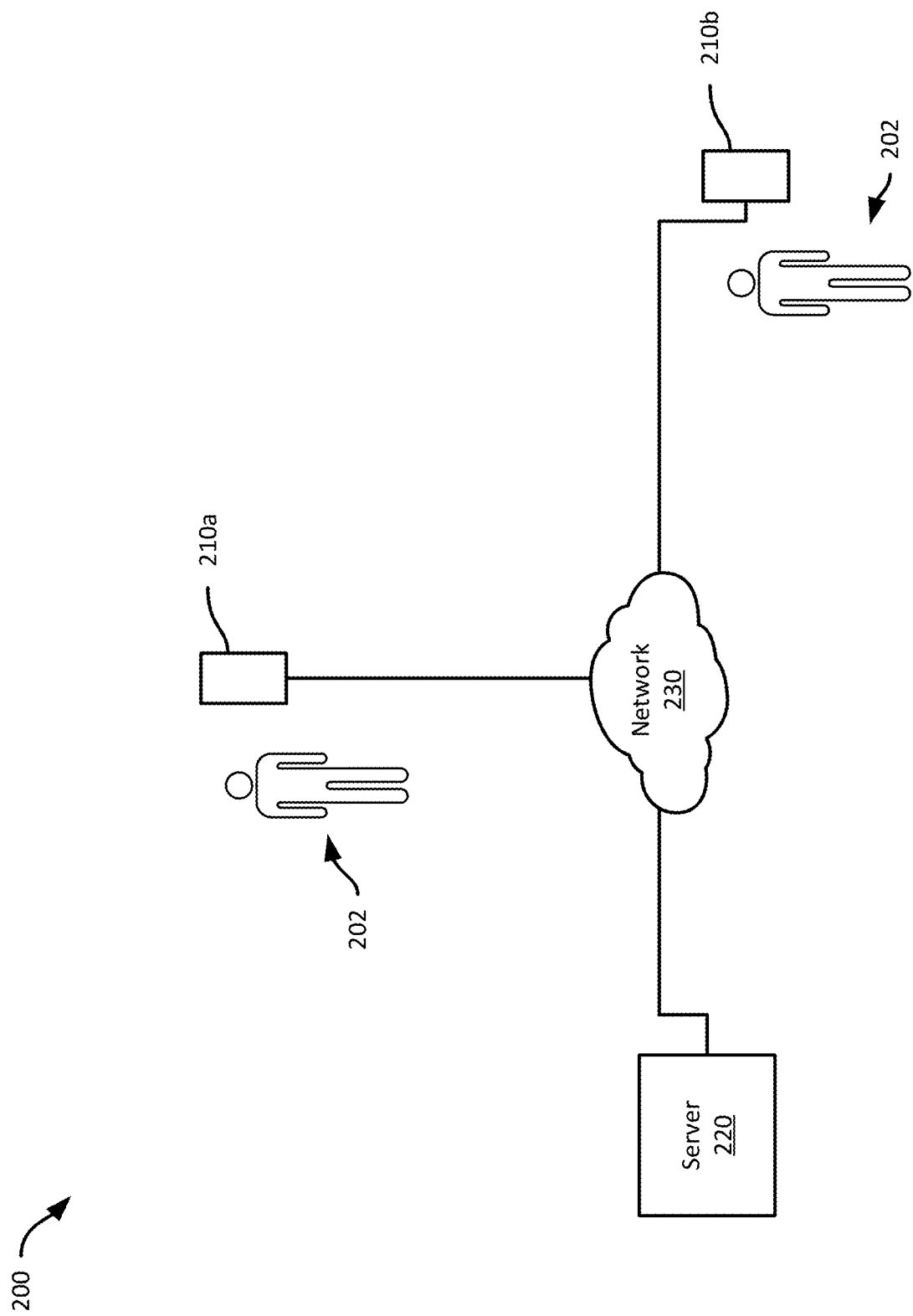

Referring now to FIG. 2, FIG. 2 shows an example system 200 for providing customizable haptic playback. In this example, two user devices 210*a-b* are in communication with a remote server 220 via one or more communications networks 230. In this example, the user devices 210*a-b* include a computing device and may further include one or more other associated devices, such as a VR or AR headset, one or more user interface devices (e.g., game controllers, styluses, driving wheels and pedals, etc.), one or more wearable devices, etc. The respective user devices 210*a-b* may each be participating in the same environment as each other, or each user may be obtaining her own specific content from the server 220, such as a movie, video, video game, music, etc. Thus, while the system 100 shown in FIG. 1 shows user devices 110*a-b* that are in essentially the same location as the server 120, the system 200 of FIG. 2 enables user to obtain content from a remote server 220. The server 220 may still provide content to one or more user devices 210*a-b* as well as associated haptic tracks and customized haptic tracks based on selected content elements as discussed herein.

Figure 3:
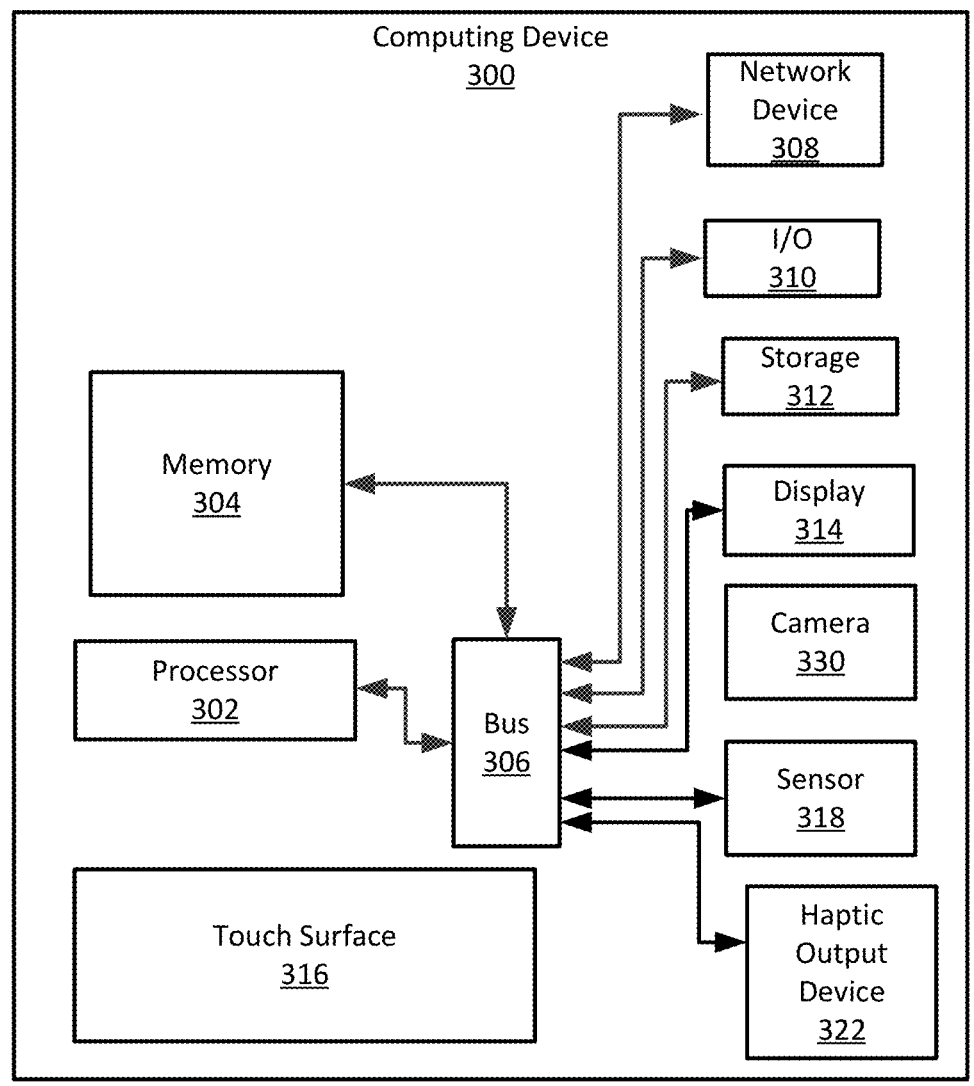
FIG. 3 shows an example computing device for providing customizable haptic playback.

Referring now to FIG. 3, FIG. 3 shows an example computing device 300 for providing customizable haptic playback according to this disclosure. The computing device 300 includes a processor 302 in communication with other hardware via a bus 306. The computing device 300 may be, for example, a personal computer, a mobile device (e.g., a smartphone), a head-mounted display, a handheld device (e.g., a tablet), or any other type of user device. In some examples, the computing device 300 can be any type of user interface device that can be used to provide content (e.g., texts, images, sounds, videos, a virtual or augmented reality environment, etc.) to a user. In some examples, the computing device 300 can be any type of user interface device that can be used to interact with content (e.g., interact with a simulated reality environment, such as, an augmented or virtual reality environment).

A memory 304, which can be any suitable tangible (and non-transitory) computer-readable medium such as random access memory ("RAM"), read-only memory ("ROM"), erasable and programmable read-only memory ("EEPROM"), or the like, embodies program components that configure operation of the computing device 300. In the embodiment shown, computing device 300 further includes one or more network interface devices 308, input/output (I/O) interface components 310, and storage 312.

Network interface device 308 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 310 may be used to facilitate wired or wireless connections to devices such as one or more displays 314, game controllers, keyboards, mice, joysticks, cameras, buttons, speakers, microphones and/or other hardware used to input or output data. Storage 312 represents nonvolatile storage such as magnetic, optical, or other storage media included in computing device 300 or coupled to the processor 302.

In some embodiments, the computing device 300 includes a touch surface 316 (e.g., a touchpad or touch sensitive surface) that can be communicatively connected to the bus 306 and configured to sense tactile input of a user. For example, touch surface 316 can include one or more touch sensors (not shown) that can be configured to detect a touch in a touch area (e.g., when an object contacts the touch surface 316) and transmits signals associated with the touch to the processor 302. In some examples, the touch surface 316 can include any suitable number, type, or arrangement of touch sensors such as, for example, resistive and/or capacitive sensors that can be embedded in touch surface 316 and used to determine the location of a touch and other information about the touch, such as pressure, speed, and/or direction. Thus, for example, the computing device 300 can be a smartphone that includes the touch surface 316 (e.g., a touch sensitive screen) and a touch sensor of the touch surface 316 can detect user input when a user of the smartphone touches the touch surface 316.

In some embodiments, the computing device 300 comprises a touch-enabled display that combines touch surface 316 and the display device 314 of the computing device 300. The touch surface 316 may be overlaid on the display device 314, may be the display device 314 exterior, or may be one or more layers of material above components of the display device 314. In other embodiments, the computing device 300 may display a graphical user interface ("GUI") that includes one or more virtual user interface components (e.g., buttons, knobs, sliders, etc.) on the touch-enabled display and the touch surface 316 can allow interaction with the virtual user interface components.

In some embodiments, the computing device 300 comprises a camera 320. Although the camera 320 is depicted in FIG. 1 as being internal to the computing device 300, in some embodiments, the camera 320 may be external to and in communication with the computing device 300. As an example, the camera 320 may be external to and in communication with the computing device 300 via wired interfaces such as, for example, Ethernet, USB, IEEE 1394, and/or wireless interfaces such as IEEE 802.11, Bluetooth, or radio interfaces.

In some embodiments, the computing device 300 comprises one or more sensors 318. In some embodiments, the sensor 318 may comprise, for example, a gyroscope, an accelerometer, imaging sensor, a camera, magnetometer, microphone, force sensor, pressure sensor, and/or other sensor that can detect, monitor, or otherwise capture information about a user (e.g., information about the user's motion). For example, the sensor 318 can be a wearable sensor, a handheld sensor, or any sensor that can be coupled (e.g., attached) to a user or otherwise associated with the user to capture motion of the user (e.g., a motion of the user's body part). In some embodiments, the sensor 318 can transmit one or more sensor signals to the processor 302 that indicate information about motion of the user. For example, the device may include two or more accelerometers, which may provide indications of motion in two or more dimensions. In some examples, the device may use one or more sensors to capture user motion with respect to different body parts. For example, sensors may detect movement of a user's arms, legs, head, hands, fingers, etc. As another example, the sensor 318 can be a pressure sensor that captures information about an amount of pressure of the user's contact with an object or a change in the amount of pressure of the user's contact.

In some embodiments, the sensor 318 may comprise any device or sensor that can detect, monitor, or otherwise capture information about the user of the computing device's or user device's interaction with content (e.g., a virtual or augmented reality environment). For example, the sensor 318 can be any sensor that can capture information about the motion of the user as the user interacts with a simulated reality environment.

Figure 4:
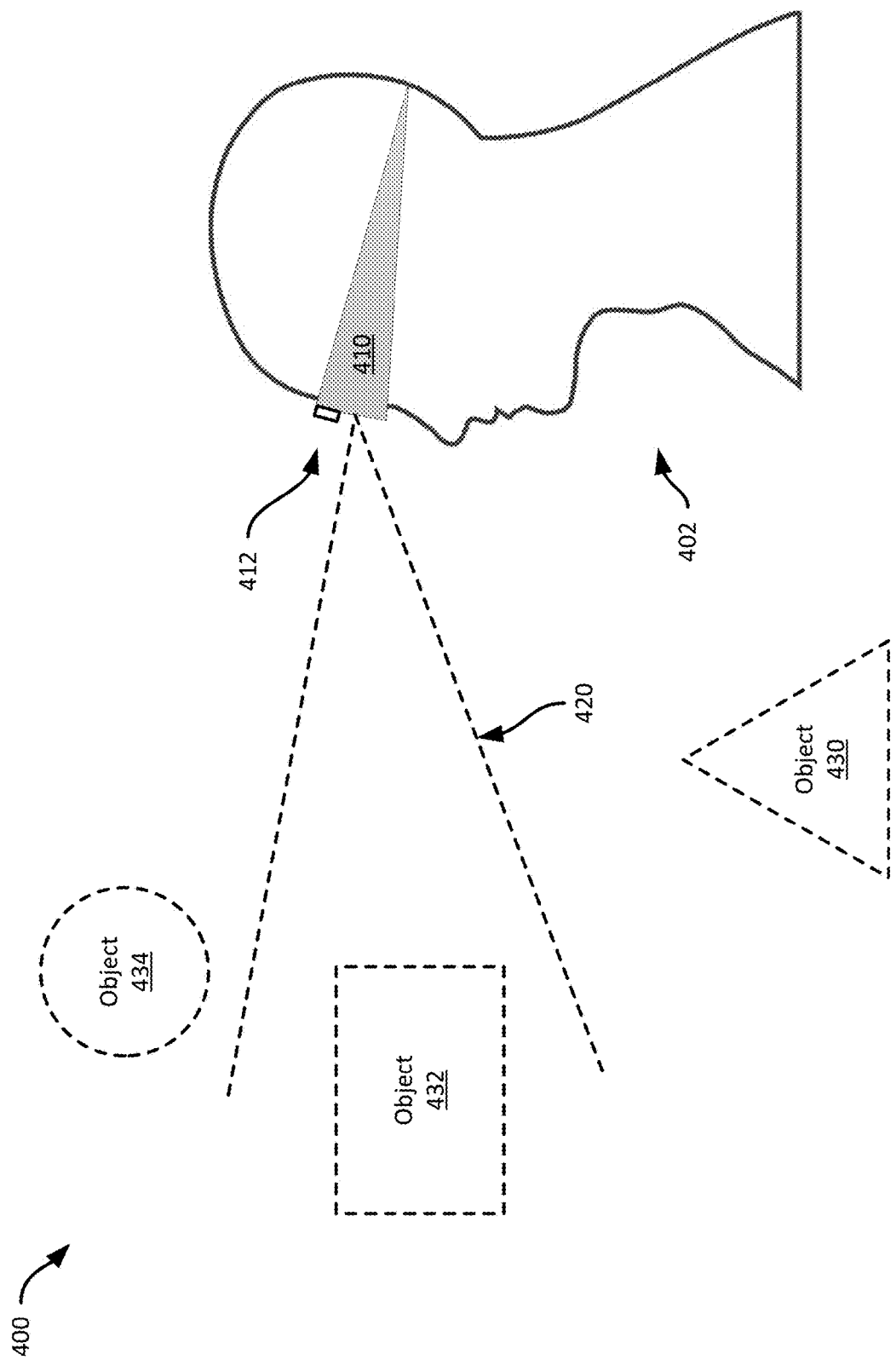
FIG. 4 shows an example simulated reality environment and headset.

In some embodiments, the computing device 300 may comprise a wearable device (e.g., glasses, a headset, etc.) and the sensor 318 may comprise any device for detecting eye gaze, line-of-sight, or field of view of the user of the computing device 300. For example, referring now to FIG. 4, FIG. 4 shows an example system 400 that includes a computing device 300 that includes or is in communication with an AR or VR headset 410 that includes one or more sensors 412. The sensor(s) 412 can detect a direction of the user's field of view 420 with respect to content (e.g., characters, objects, virtual objects, virtual animations, etc.) displayed via the display device 314 or another display device. In this example, the display device 314 outputs multiple virtual objects 430-434, one of which is within the user's field of view 420. Thus, in this example, the sensor 412 may detect the user's gaze or eye direction and provide such information to the processor 302 or other computing device (e.g., a server 120, 220), which may determine a content element, e.g., object 432, that the user is looking at.

In some examples, the sensor 412 may include a camera or be incorporated into the camera 320. Such a sensor can be configured to capture an image of the eye of the user of the computing device 300 (the headset 410 in this example) and the processor 302 can determine the direction of the field of view of the user relative to content on the display device 314 or other display based at least in part on the image by using one or more eye-tracking or gaze-tracking methods and techniques. In another embodiment, the sensor 410 can be configured to monitor movements of an eye of the user or muscles near an eye of the user of the computing device 300 and the processor 302 is configured to determine the direction of the user's field of view relative to content on the display device 314 based at least in part on the monitored movements. In still another embodiment, the sensor 318 may be configured to monitor or measure electrical activity of muscles moving the eye of the user and the processor 302 can be configured to determine the direction of the user's field of view relative to content on the display device 314 or another display device.

Referring again to FIG. 3, In some embodiments, the sensor 318 may include other sensors used to determine a user's intent or volition, including, for example, sensors associated with functional magnetic resonance imaging ("fMRI") or electroencephalogram ("EEG"). In still another embodiment, the sensor 318 may detect the user's eye gaze, line-of-sight, or field of view through various methods and techniques, including, for example, analyzing the user's body or head posture. As an example, the sensor 318 can be included in a head-mounted display or be a head-mounted sensor for detecting a motion of the user's head or for detecting the user's head posture and transmitting data about the motion of the user's head or data about the user's head posture to the processor 302, which can determine the direction of the field of view of the user of the computing device 300 or user device 124 based on the data.

In some embodiments, the computing device 300 further includes a haptic output device 322 in communication with the processor 302. The haptic output device 322 is configured to output a haptic track or haptic effect in response to a haptic signal. For example, the haptic output device 322 can output a haptic track in response to a haptic signal from the processor 302 of the computing device 300. In some embodiments, the haptic output device 322 is configured to output a haptic track comprising, for example, a vibration, a squeeze, a poke, a change in a perceived coefficient of friction, a simulated texture, a stroking sensation, an electro-tactile effect, a surface deformation (e.g., a deformation of a surface associated with the computing device 300), and/or a puff of a solid, liquid, or gas. Further, some haptic tracks may use multiple haptic output devices 322 of the same or different types in sequence and/or in concert.

Although a single haptic output device 322 is shown in FIG. 3, some embodiments may use multiple haptic output devices 322 of the same or different type to produce haptic effects. In some embodiments, the haptic output device 322 is internal or external to the computing device 300 and in communication with the computing device 300 (e.g., via wired interfaces such as Ethernet, USB, IEEE 1394, and/or wireless interfaces such as IEEE 802.11, Bluetooth, or radio interfaces). For example, the haptic output device 322 may be associated with (e.g., coupled to or within) the computing device 300 and configured to receive haptic signals from the processor 302.

The haptic output device 322 may comprise, for example, one or more of a piezoelectric actuator, an electric motor, an electro-magnetic actuator, a voice coil, a shape memory alloy, an electro-active polymer, a solenoid, an eccentric rotating mass motor (ERM), a linear resonant actuator (LRA), a spinning or scalable rotary actuator (SRA), an ultrasonic actuator, a piezo-electric material, a deformation device, an electrostatic actuator, a shape memory material, which includes a metal, polymer, or composite, or a solenoid resonance actuator. In some embodiments, the haptic output device 322 comprises fluid configured for outputting a deformation haptic effect (e.g., for bending or deforming a surface associated with the computing device 300). In some embodiments, the haptic output device 322 comprises a mechanical deformation device. For example, in some embodiments, the haptic output device 322 may comprise an actuator coupled to an arm that rotates a deformation component. The actuator may comprise a piezo-electric actuator, rotating/linear actuator, solenoid, an electroactive polymer actuator, macro fiber composite (MFC) actuator, shape memory alloy (SMA) actuator, and/or other actuator. As used herein, the term "MFC element" is used to refer to a component or element that acts as both an actuator and a sensor.

In some embodiments, the computing device 300 can include a user device that can be, for example, a mobile device (e.g., a smartphone), smartwatch, a head-mounted display, a wearable device, a handheld device (e.g., a tablet, video game controller), or any other type of user interface device. In some examples, the user device can be any type of user interface device that can be used to provide content (e.g., texts, images, sounds, videos, a virtual or augmented reality environment, etc.) to a user. In some examples, the user device can be any type of user interface device that can be used to interact with content (e.g., interact with a simulated reality environment, such as, an augmented or virtual reality environment).

The computing device 300 may be employed to provide content to a user and to provide customized haptic effects. For example, the computing device 300 can provide content to the user, such as by displaying images on the display 314. Such content may be stored locally in memory 304 or storage 312, or may be received from a remote computing device, such as described above with respect to FIGS. 1 and 2.

As discussed above, content may have one or more associated haptic tracks. For example, correspondences between content or content elements and one or more haptic tracks may be stored in lookup tables or databases. Each haptic track may be associated with one or more content elements, such as characters, objects, events, etc. in the content provided to the user, and each content element may be associated with one or more haptic tracks. A haptic track can include a haptic effect (e.g., a vibration, a friction effect, a deformation effect, a thermal effect) or a series of haptic effects that correspond to content elements within the provided content. In some embodiments, different haptic tracks may be provided and associated with both a content element as well as a particular perspective view of the content. For example, a front view associated with a particular content element may have one haptic track (e.g., the front view of a vehicle may have an engine haptic track), while a rear view may have a different haptic track (e.g., an exhaust haptic track).

In another example, if a video includes a character, a haptic track can include a series of vibrations or other haptic effects that correspond to each action or event associated with the character in the video and the lookup table or database can include data indicating a mapping of the character to the haptic track. In this example, the computing device 300 may access the lookup table or database and generate an interactive user interface for displaying data indicating the mapping between the character and the haptic track. As an example, the interactive user interface can include menu, list, etc. that includes a haptic track associated with each character, event, object, etc. in the video. In another example, if the content includes a simulated reality environment, a haptic track can include various haptic effects that correspond to the various viewpoints of the simulated reality environment (e.g., a viewpoint from behind the user, in front of the user, etc.). In this example, the computing device 300 may access a lookup table and generate an interactive user interface that displays the mapping between the various viewpoints of the simulated reality environment and the various haptic tracks. In some embodiments, the computing device 300 may generate an interactive user interface that displays each haptic track associated with each character, event, object, etc. in the content and each viewpoint for each character, event, object, etc.

For example, the computing device 300 may receive user input via an interactive user interface indicating a selection of a haptic track or a character. For instance, the user can provide user input indicating a haptic track of interest by clicking on the first haptic track or the first character, touching the touch surface 316 or touch surface 138 to select the first haptic track or the first character, pointing at the first haptic track or first character (e.g., using the user device 124), etc. In this example, the user may also provide user input to mute the second haptic track associated with the second character, which may enable the user to better focus on the first character.

In some examples, rather than obtaining a user selection, the computing device 300 may automatically select (e.g., absent user input) a haptic track associated with a content element within the content provided to the user. For example, the computing device 300 may provide content to be output on the display device 314 or the display device 136 that includes a simulated environment having a first character associated with a first haptic track and a second character associated with a second haptic track. To select a character or haptic track, the computing device 300 may determine a distance between the user and the first or second character within the environment. The distance may be determined using respective coordinates of the user and the characters within the simulated environment, or between the user and another user (or the other user's avatar) within the simulated environment.

After determining the respective distances between the user and the other characters, the computing device 300 can determine that the first virtual character is closer to the user than the second virtual character. In this example, the computing device 300 may then automatically select a haptic track based on the determined distance between the user and the first and second characters. For instance, the computing device 300 can automatically select the first haptic track associated with the first virtual character in response to determining that the user is closer to the first virtual character as compared to the second virtual character. The computing device 300 may also select the second haptic track associated with the second character, but may emphasize the first haptic track and deemphasize the second haptic track.

As another example, the computing device 300 can be, or be in communication with, a wearable device (e.g., glasses, a headset, etc.) and a sensor (e.g., sensor 412) can detect an eye gaze, line-of-sight, or a direction of a field of view of the user. The sensor can transmit a sensor signal to the processor 302, which can determine that the user is looking at, or in the direction of, the first haptic character, or data about the first haptic track in an interactive user interface. In this example, the processor 302 can select the first haptic track in response to determining that the user is looking at, or in the direction of, the first character.

In some embodiments, selection of a particular haptic track associated with a particular character, object, event, etc. of interest in the content provided to the user (e.g., based on user input or automatically as described above) can indicate a muting of an un-selected haptic track. For instance, if the user selects the first haptic track associated with the first character and does not select the second haptic track associated with the second character, the processor 302 can mute the second haptic track. In this manner, the system 100 can select a particular haptic track associated with a particular character, object, event, etc. of interest to the user.

Haptic tracks may be implemented in many different ways. For example, a haptic track may have information describing a single haptic effect or multiple haptic effects that may be output in series, in parallel, or a combination of both. Further, a haptic track may include one or more nested haptic tracks. For example, a haptic track for a scene in a movie may have nested haptic tracks for each character present in the scene, a haptic track for the setting or context of the scene, one or more haptic tracks for environmental conditions within the scene, etc. In some examples, a haptic track may include metadata indicating portions of the haptic track that are associated with different content elements within the associated content. For example, a haptic track may include a sequence of haptic effects that track different shots within a scene. For example, the haptic track may have a first haptic effect corresponding to the main character appearing on screen along with a corresponding metadata tag identifying the main character. The second haptic effect may correspond to a supporting character that appears next in the scene, and the haptic track may have a second tag corresponding the second haptic effect. Thus, the haptic track may have a set of haptic effects each of which may be tagged with one or more content elements. Such tagging may enable systems and methods according to this disclosure to identify specific portions of the haptic track as being associated with a selected content element. These specific portions of the haptic track may then be modified as described herein, while the other portions of the haptic track may be left unchanged, deemphasized, or disabled, depending on the implementation or specific configuration.

In some examples, associations between haptic tracks and content elements may be inferred based on one or more types associated with a haptic track. For example, a database may include a large number of haptic tracks that may be used to supply haptic tracks for any suitable content. Each of the haptic tracks may be identified based on a type of content element, such as "explosion," "rainfall," "car engine," etc. At a later time, content may be developed and tagged with metadata indicating different characters, events, contexts, or environmental conditions. When a computing device receives content to be output it may examine tags within the content and access the database to obtain haptic tracks matching the tags within the content. Further, the use of such tags may enable the computing device 300 to emphasize, deemphasize, or disable one or more haptic tracks based on a selected content element or to modify a haptic track, such as by combining two or more haptic tracks together as is discussed in more detail herein.

Some example may employ multiple different haptic tracks associated with a content element. For example, different haptic tracks may be associated with different perspective views of the content element. A racing simulator may allow a user to simulate driving a race car on a race track. Other cars in the race may each have different haptic tracks associated with them, such as based on the make and model of the respective car. Further, different haptic tracks may be associated with different views of the respective car. For example, one haptic track may be associated with the front of the car where the engine is located, while a second haptic track may be associated with the rear of the car where the exhaust is located. Still further haptic tracks may be associated with the sides of the car related to the sound of tires on the pavement. And while multiple different haptic tracks are associated with different perspectives, in some examples, some or all of the haptic tracks may be mixed together irrespective of the particular perspective, with each haptic track weighted according to the user's particular view point at a moment in time.

In some embodiments, the computing device 300 may modify an identified haptic track. For instance, the computing device 300 can receive user input to modify a characteristic (e.g., an intensity, magnitude, etc.) of the identified haptic track and the computing device 300 can modify the haptic track in response to receiving the user input. As an example, the user can provide user input to modify an intensity of the haptic track via a contact on the touch surface 316 and a touch sensor of the touch surface 316 can transmit a sensor signal indicating the user input to the computing device 300. In this example, the computing device 300 can determine an amount of pressure of the user's contact with the touch surface 316 and determine an intensity of the haptic track based on the amount of pressure. For instance, the computing device 300 can determine that the identified haptic track includes one or more strong vibrations in response to determining that the amount of pressure of the user's contact is above a threshold. In some examples, the strength of one or more vibrations may be in proportion (or inverse proportion) to the amount of force applied. For example, a high level of force may signal the user's intent to reduce the intensity of the vibration and thus, a weaker vibration may be played, while a low level of force may indicate a desire that stronger vibration should be played.

In another example, the computing device 300 can determine or modify a characteristic of the identified haptic track based on one or more sensor signals. For example, the computing device 300 can determine or modify a characteristic of the identified haptic track based on a motion by the user. For instance, the computing device 300 may determine the user is approaching a selected content element, such as a door or another character, and increase an intensity of the identified haptic track, or it may de-emphasize one or more other haptic tracks not associated with the selected content element. In some examples, the computing device 300 may determine a context for a scene having the selected content element, such as a character, and modify the haptic track based on the context. For example, if the user has selected a character in a movie, the computing device 300 may emphasize haptic tracks associated with the character whenever the character is on screen. However, the computing device 300 may modify the character's haptic track if the selected character appears in a scene where he is in danger. For example, the computing device 300 may overlay a heartbeat effect on the haptic track to indicate the character's stress. Or if the character is in a relaxing scene, the computing device may modify the haptic track to eliminate any sharp haptic effects, such as jolting effects. For example, the computing device may filter high-frequency effects, e.g., effects having frequencies over approximately 1000 Hz, out of the haptic track In still another example, the processor 302 can determine or modify a characteristic of the selected haptic track based on a distance between the user and a content element. For instance, the computing device 300 can receive or provide content to be output on the display device 314 and the content can include a simulated environment that includes one or more other characters. Then, as the user interacts with the simulated environment, the computing device 300 can determine or modify a characteristic of the selected haptic track based on a changing distance between the user and the characters. For example, if a first character is selected, such as based on the user's gaze, the computing device 300 can determine that the user is close to the first character and modify the identified haptic track to increase the intensity of the haptic effects.

In some embodiments, the computing device 300 may modify a characteristic of a haptic track by combining one or more haptic tracks together. For instance, a content element may be selected and an associated haptic track identified. However, a context associated with the character, such as a dangerous situation, may have an associated haptic track as well. The computing device 300 may then combine the two haptic tracks, despite the user having selected the first character. To combine the haptic tracks, the computing device 300 may sum the two haptic tracks, which may include applying a weight value to one or both haptic tracks and summing the weighted haptic tracks. In some examples, a characteristic of the additional haptic track may be extracted and applied to the selected character's haptic track. For example, the additional haptic track may have an magnitude or a frequency associated with one or more of its haptic effects. The computing device 300 may analyze the character's haptic track and the additional haptic track to identify similar haptic effects. The computing device 300 may then apply one or more parameters of the haptic effects from the additional haptic track to the character's haptic track.

In some embodiments, the computing device 300 may determine a haptic track based on an event. An event, as used herein, is any interaction, action, collision, or other event, which occurs during operation of the computing device 300, which may have an associated haptic effect. In some embodiments, an event may comprise user input (e.g., a button press, manipulating a joystick, interacting with a touch surface 316 or touch surface 138, tilting or orienting the computing device 300), a system status (e.g., low battery, low memory, or a system notification, such as a notification generated based on the system receiving a message, an incoming phone call, a notification, or an update), sending data, receiving data, a program event (e.g., if the program is a game, a program event may comprise explosions, gunshots, collisions, interactions between game characters, interactions between a user and one or more elements in a simulated environment, a movement of a character in a simulated environment, etc.), or an action by a user (e.g., motion of the user).

Once a haptic track has been identified and one or more characteristics of the haptic track have been modified, the computing device 300 may generate and transmit a haptic signal to a haptic output device. For example, the computing device 300 may transmit a signal to the haptic output device to output the modified haptic track.

In some embodiments, the computing device may employ machine learning techniques to automatically select or deselect content elements based on learned user preference, which may thereby automatically emphasize, deemphasize, or disable one or more haptic tracks without further user interaction. For instance, the computing device 300 may determine, over time, that a user dislikes haptic effects associated with violence, e.g., gunfire, explosions, etc., but likes haptic effects associated with characters played by a particular actor or associated with a particular role, e.g., a hero. Based on these learned preferences, the computing device 300 can automatically select content elements and identify associated haptic tracks. Based on such selections, the computing device 300 can emphasize, deemphasize, or disable one or more such haptic tracks based on the user preferences.

For instance, if the user selects a character in the content but deselects one or more explosions in the content, the processor 302 can analyze the content and determine one or more other haptic tracks that are similar to the first haptic track or the second haptic track. As an example, if the character is the main character in the content, the processor 302 can analyze the content and determine that the content includes a haptic track associated with another main character in the content, which is similar to the selected haptic track associated with the first character. As another example, the processor 302 can analyze the content, determine that the content includes a haptic track associated with gunshots or collisions, and that the haptic track associated with gunshots or collisions is similar to the muted haptic track associated with explosions. In this example, the processor 302 can train the machine-learning technique to predict that the user prefers haptic tracks associated with characters and does not prefer haptic tracks associated with gunshots, explosions, collisions, etc.

In some embodiments, the computing device 300 can solicit feedback from the user regarding the automatically selected content elements and use the responses to further train the machine learning technique. For example, the computing device may output a query to the user asking whether the user wants to select the main character or deselect further gunshots or collisions. In some embodiments, the processor 302 can train the machine-learning technique to predict the user's haptic track preferences using real-time data (e.g., as the user selects or deselects one or more content elements) or using historical data (e.g., data obtained or received by the processor 302 indicating the user's historical selection or deselection of content elements). For instance, the processor 302 obtains or receives data indicating a user's selection or muting of one or more haptic tracks associated with a character, event, object, etc. in content provided to the user. In this example, as the user selects or mutes one or more of the haptic tracks or as one or more haptic tracks are selected or muted automatically, the processor 302 can train the machine-learning technique to identify similar haptic tracks as described above and the processor 302 can output a recommendation to select or mute similar haptic tracks in substantially real-time (e.g., as a haptic track is selected or muted) and/or request user input indicating whether the user wants to select or mute the recommended haptic tracks.

In some embodiments, the computing device 300 can use data about a characteristic of a selected haptic track (e.g., a modification to a characteristic of the haptic track by the user or an automatic modification to the characteristic of the haptic track) to train a machine-learning algorithm to predict a characteristic or modification to a haptic track in substantially the same manner as described above.

For instance, the computing device 300 can obtain or receive data indicating a user's modification to a selected haptic track or an automatic modification to the selected haptic track (e.g., modification to an intensity of the selected haptic track). In this example, as the selected haptic track is modified, the computing device 300 can train the machine-learning technique to determine a similar haptic track and output a modification of the similar haptic track in the same manner in substantially real-time and/or request user input indicating whether the user wants to modify the selected haptic track. For instance, if the user provides user input to increase an intensity of the selected haptic track, the computing device 300 can use this input to train the machine-learning technique to identify a similar haptic track in the content and output a modification to increase the intensity of the similar haptic track or request user input indicating whether the user wants to increase the intensity of the similar haptic track.

While in some examples described above, the computing device 300 outputs content, generates interactive user interfaces, determines a selected content element, identifies a haptic track, modifies the identified haptic track, and/or trains a machine-learning technique, the present disclosure is not limited to such configurations.

Although the example computing device 300 of FIG. 3 is depicted as having a certain number of components, in other embodiments, the computing device 300 may have any number of additional or alternative components.

Figure 5:
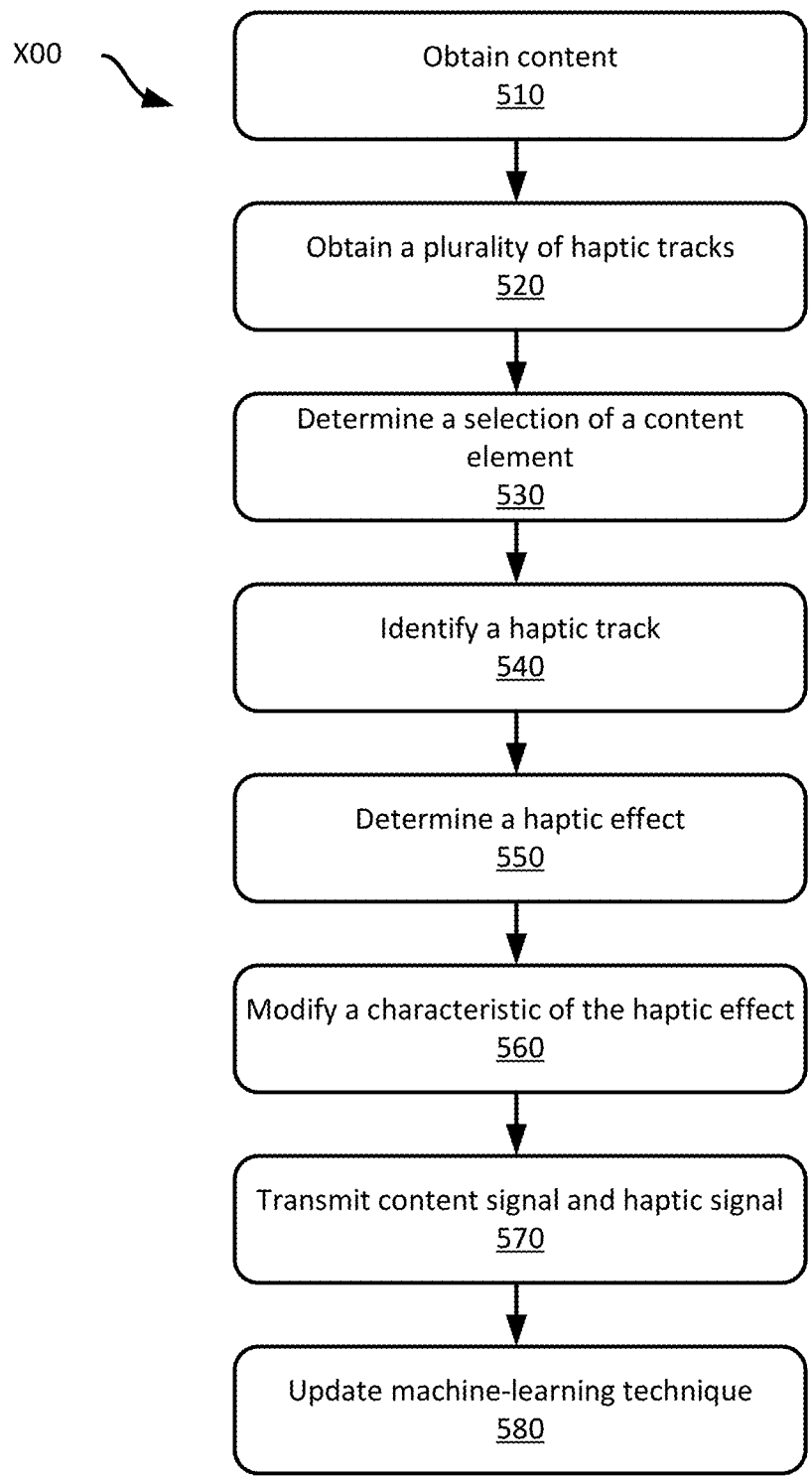
FIG. 5 shows an example method for providing customizable haptic playback.

Referring now to FIG. 5, FIG. 5 shows an example method 500 for providing customizable haptic playback. In some examples, the blocks shown in FIG. 5 may be implemented in program code that is executable by a processor, for example, the processor in a general purpose computer, a mobile device, or a server. In some embodiments, these steps may be implemented by a group of processors. In some embodiments, one or more steps shown in FIG. 5 may be omitted or performed in a different order. Similarly, in some embodiments, additional steps not shown in FIG. 5 may also be performed. For illustrative purposes, the steps of the method 500 are described below with reference to components described above with regard to the system 100 shown in FIG. 1, but any suitable system according to this disclosure may be employed.

The method 500 begins at step 510 when the server 120 or the user devices 110*a*, 110*b* obtains content to be provided to a user. In this example, the user devices 110*a*, 110*b* receives content from the server 120; however, in some examples, the user devices 110*a*, 110*b* obtains content from its own local storage or dynamically generates the content, such as by generating a game environment or simulated reality environment. As discussed above, any suitable content may be obtained, including simulated reality environments, video game content, movies, music, etc.

At block 520, the server 120 or the user devices 110*a*, 110*b* obtains data identifying a plurality of haptic tracks associated with one or more content elements in the content. For example, the user devices 110*a*, 110*b* may receive one or more haptic tracks from the server 120 either before, concurrently with, or after obtaining the content at block 510. In some examples, the user devices 110*a*, 110*b* may have one or more haptic tracks stored locally in the user devices 110*a*, 110*b*, such as in a database stored in memory.

In addition to obtaining the haptic tracks, the user devices 110*a*, 110*b* obtains data identifying a plurality of haptic tracks associated with one or more content elements in the content. In this example, the data identifying the plurality of haptic tracks comprises metadata contained within the content. For example, such metadata may include one or more metadata tags identifying one or more haptic tracks. In other examples, however, the data may include references to database records, one or more filter parameters to select haptic tracks from a repository of haptic tracks, etc. In one example, the data may be the haptic tracks themselves, which include associations to one or more content elements or one or more types of content elements within the content.

In some examples, the haptic tracks may be provided separately from the content; however, in some examples, the content may contain the haptic tracks as well as associations between the haptic tracks and one or more content elements. In some examples, the haptic tracks may be tracks within the content similar to an audio track wherein one or more haptic effects are synchronized in time with audio or video data. In one such example, playback software executed by the user devices 110*a*, 110*b*, e.g., a video player, may stream audio, video, and haptic data from the content and transmit corresponding signals to a display, speaker, and one or more haptic output devices.

As an example, if the content includes a simulated reality environment that includes an object, such as, for example, a tennis ball, a haptic track associated with the object can include a series of vibrations or other haptic effects that correspond to each action or event associated with the object such as, for example, a bouncing of the tennis ball, hitting the tennis ball, etc. In this example, a database of haptic tracks can include data indicating a mapping between the object and the haptic track. As another example, if the content includes a video, such as, for example, a video of a tennis match, a haptic track associated with a viewpoint or perspective of a character or object in the tennis match can include one or more haptic effects that correspond to the perspective or viewpoint of the character or object such as, for example, a perspective of a player in the tennis match, a spectator, etc.

At block 530, the server 120 or the user devices 110*a*, 110*b* determines a selection of a content element of the plurality of content elements. In this example, the users 102, 104 are interacting with a simulated reality environment using their respective VR headsets 110*a*-*b*, and are able to identify and interact with objects displayed within the environment. The server 120 is able to determine selected content elements, such as objects, characters, etc., based on sensor signals received from the VR headsets the direction of the user's gaze based on the position and orientation of the respective VR headset and the direction the user's eyes are looking. In some examples, the user may also use user interface devices such as handheld control devices, joysticks, wands, etc., with which the user may transmit commands to the server 120. Some examples may allow the user to make gestures, such as on a touch screen or in open air, to interact with objects within the environment. Such commands may indicate a selection of or interaction with a content element within the simulated reality environment. Further, in some examples, objects or characters within the environment may interact with the user, and thus may select themselves, such as when the user comes within a threshold distance of the respective content element, upon completing a quest or task, or upon triggering an event within the environment.

In other contexts, the user may explicitly select a particular content element, such as a character in a movie. The selection may be performed while the movie is played or, in some examples, the user may be presented with such options prior to the movie being played. In other examples, the user may select one or more instrumental tracks of a piece of music that has an associated haptic track. For example, an orchestral piece may have haptic tracks corresponding to different instruments or sections of the orchestra, e.g., the violins, the cellos, the woodwinds, etc. Such selections, whether with respect to a simulated reality environment, a movie, a piece of music, etc., may be made with respect to a specific content element in a specific piece of content, or may be made at a more global level, such as for all movies or music, or at an intermediate level, such as for all albums from a particular musical group or composer, or a character in movies within a movie series, e.g., Princess Leia.

At block 540, the server 120 or the user devices 110a, 110b identifies a haptic track associated with the selected content element. In this example, the user devices 110a, 110b identifies a haptic track associated with a selected content element using the previously obtained data at block 520; however, in some examples, the functionality described at block 520 may be performed in real-time. For example, when a content element is selected at block 530, functionality described at block 520 may obtain data identifying one or more haptic tracks associated with the selected content element. After receiving such haptic tracks, the server 120 or user devices 110a, 110b may identify one or more of such haptic tracks.

In some examples, an identified haptic track may be indirectly associated with the selected content element. For example, a haptic track associated with a supporting character may be identified when the main character is selected. Such an identification may be made if the supporting character and the main character are engaged in a confrontation or are romantically connected. In some examples, a haptic track may be identified based on a type of content element selected. For example, if a content element is an explosion, a specific haptic track may not be explicitly associated with the explosion, however, a haptic track indicated as related to explosions, gunfire, and bombs may be identified. Such an identification may be enabled by metadata tags stored within the content, which indicate events, characters appearing or leaving the screen, etc. Thus, even if the obtained content does not have its own custom haptic tracks, metadata within the content may enable haptic tracks in a library to be identified.

In some examples, a user may explicitly identify a haptic track. For example, the server 120 or user devices 110a, 110b may generate an interactive user interface that displays data about a character, object, or event and a haptic track associated with the character, object, or event. As an example, the user devices 110a, 110b can generate an interactive user interface that includes a menu, list, etc. that includes data about a haptic track associated with each character, event, object, etc. in the obtained content. The user may then identify one or more such haptic tracks. As another example, the user devices 110a, 110b can generate an interactive user interface that includes a menu, list, etc. that includes data indicating a haptic track associated with one or more viewpoints of the content or viewpoints of a character, event, object, etc. in the content. For instance, the user devices 110a, 110b can generate an interactive user interface that include a menu that includes a haptic track associated with a view point behind the user or character, in front of the user or a character, beside the user or character, etc. In some embodiments, the user devices 110a, 110b can generate an interactive user interface for displaying each haptic track associated with each character, event, object, etc. in the content and each viewpoint for each character, event, object, etc.

In some examples, a machine-learning technique may be trained to select content elements based on content elements detected within obtained content, and further to identify haptic tracks associated with a selected content element. For example, the machine-learning technique may be trained to recognize content elements like characters, e.g., using facial recognition, or objects, e.g., using object recognition. Further, some events may be detectable, such as explosions, gunshots, rain, fire, etc. and one or more haptic tracks may be identified by the machine learning technique. An example machine learning technique that has been trained according to a user's preferences may automatically select, or may suggest, one or more content elements or, conversely, may automatically deselect, or suggest for deselection, one or more content elements.

In some examples, the server 120 or user devices 110a, 110b may identify a haptic track based on a distance between the user and one or more characters or virtual objects within a simulated reality environment. As an example, as the user interacts with the simulated environment, the processor 302 can determine that a virtual object is closer to the user in the simulated environment than a nearby character. The server 120 or user devices 110a, 110b may identify a haptic track associated with the virtual object in response to determining that the user is closer to the virtual object than the character. In some examples, however, the server 120 or user devices 110a, 110b may identify multiple haptic tracks based on proximity to multiple content elements.

As another example, the user devices 110a, 110b can be a wearable device (e.g., glasses, a headset, etc.) and a sensor of the user devices 110a, 110b can detect an eye gaze, line-of-sight, or a direction of a field of view of the user. The user devices 110a, 110b (or the server 120) can receive one or more sensor signals and determine that the user is looking at, or in the direction of, the character. In still another example, the user devices 110a, 110b can be a handheld device (e.g., a game controller, joystick, etc.) and the sensor of the user device can detect a motion of the user and the transmit a sensor signal to the server 120 or user devices 110a, 110b, which can determine that the user is pointing at, or directing the user devices 110a, 110b at the character.

In some embodiments, identification of a particular haptic track associated with a particular character, object, event, etc. of interest in the content provided to the user (e.g., based on user input or automatically as described above) can cause a deselection or a muting of un-selected haptic tracks. In this manner, the system 100 can select a particular haptic track associated with a particular character, object, event, etc. of interest to the user, while muting other haptic tracks that might otherwise distract from the select content element.

At block 550, the system 100 determines a haptic effect based on the identified haptic track. In some examples, the haptic track may include one or more haptic effects embedded within the haptic track; however, haptic tracks may also include references to haptic effects stored in other locations, such as in a database. Further, examples may employ a haptic track that includes haptic effects associated with multiple different content elements, which may be tagged with metadata identifying the associated content element(s).

Haptic effects as a part of a haptic track may be output in a specific sequence or with specific timings. In some examples, specific haptic effects of a haptic track may be output based on actions taken with respect to the selected content element or events involving that element. Thus, a haptic effect may be selected based on the state of the selected content element, a user's interaction with the selected content, or events that involve or are proximate (e.g., in a simulated reality environment) the content element.

At block 560, the system 100 modifies a characteristic of the haptic effect. For instance, the processor 302 can receive user input to modify a characteristic (e.g., an intensity, magnitude, etc.) of the haptic effect and the system 100, e.g., the server 120 or a user devices 110*a*, 110*b*, can modify the haptic effect in response to receiving the user input. As an example, the user can provide user input to modify an intensity of the haptic track via a contact on the touch surface 316 and a touch sensor of a touch surface 316 can transmit a sensor signal indicating the user input to the processor 302. In this example, the user devices 110*a*, 110*b* can determine an amount of pressure of the user's contact with the touch surface 316 and determine an intensity of the haptic track based on the amount of pressure. For instance, the processor 302 can modify a characteristic of the haptic track to decrease a magnitude of a haptic track or haptic effect in response to determining that the amount of pressure of the user's contact is above a threshold.

In another example, the computing device 300 can modify a characteristic of the selected haptic track based on a motion by the user. For example, the user devices 110*a*, 110*b* may modify a characteristic of a haptic track based on a user selection of the content element. Such a command may indicate the user is focusing on the content element and so an intensity or duration of the associated haptic track may be increased to emphasize it. In some examples, a haptic track may be deemphasized or disabled (e.g., muted) based on a user's deselection of an associated content element or the haptic track itself.

In another example, the computing device 300 can determine or modify a characteristic of the selected haptic track based on an eye gaze, line-of-sight, or field of view of the user. For example, a haptic track associated with a selected content element may be modified depending on the user's gaze. If the user looks directly at the selected content element, the computing device may modify a characteristic of the haptic track to provide a maximum magnitude for the associated haptic effect(s); however, if the user changes the direction of his gaze, the computing device 300 may reduce the magnitude of the haptic track in proportion to the angle of the user's gaze away from the object. In other words, a first line may be projected towards the selected content element from the user's eye, while a second line may be projected in the sensed gaze direction, and an angle may be determined between the two lines. Further, in some examples the computing device 300 may modify haptic effects to provide directional haptic effects to help guide the user towards the selected content element. For example, if a VR or AR headset has multiple haptic output devices arrayed at different locations, the computing device 300 may generate haptic effects of varying magnitude such that, irrespective of the direction of the user's gaze or the orientation of the headset, the haptic track may be apparently emanating from the direction of the selected content element, which may enable the user to move their head to find the selected content element. Thus, magnitudes of haptic signals sent to various haptic output devices may be modified to provide an apparent directional haptic effect.

Such a technique may be employed in the context of a handheld device that may be maneuvered in space to interact with content. For example, if the user is able to change the orientation of a handheld device to view different portions of content, a haptic track may be modified based on the orientation of the handheld device with respect to the selected content element.

In still another example, the computing device can determine or modify a characteristic of the selected haptic track based on a distance between the user and the selected content element within a simulated reality environment, or in a picture or video based on an apparent distance of the selected content element from the screen. For instance, if the selected haptic track is the first haptic track associated with the first character, the computing device 300 can determine that the user is close to the first character in the simulated environment and increase a magnitude or duration of the selected haptic track.

At block 570, the computing device transmits a content signal to an output device, such as a display or speaker, and a haptic signal associated with the modified haptic track to a haptic output device. In some examples, the content signal and the haptic signal are output to provide synchronized output of the content and the corresponding haptic effect.

In some examples, a further block 580 may be employed to train a machine learning technique based on a selection of a content element, a haptic track, or based on user-provided modifications to a haptic track. For example, if a user deselects a particular haptic track or one or more haptic effects, the machine learning technique may be biased against future selection of such haptic tracks or effects. In some examples, user selection of a particular character or actor may bias a machine-learning technique to select such content elements in the future. Further, a user may deselect a haptic track related to certain types of events, such as explosions or other loud noises. Thus, the machine learning technique may bias itself against haptic tracks or content elements associated with such events or characteristics.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
a non-transitory computer-readable medium; and
a processor communicatively coupled to the non-transitory computer-readable medium, wherein the processor is configured to execute processor-executable instructions stored in the non-transitory computer-readable medium to:
obtain content to be provided to a user;
obtain data identifying a plurality of haptic tracks associated with a plurality of content elements of the content;
cause an output device to play a portion of the content;
determine a selection of a content element of the plurality of content elements in the portion of the content;
in response to a determination of the selection of the content element and while the output device plays the portion of the content:
identify a haptic track of the plurality of haptic tracks, the haptic track associated with the content element;
determine one or more haptic effects based on the haptic track;
transmit one or more haptic signals to a haptic output device, the one or more haptic signals configured to cause the haptic output device to output the one or more haptic effects corresponding to the content element in the portion of the content.

2. The system of claim 1, wherein the processor is further configured to execute processor-executable instructions stored in the non-transitory computer-readable medium to modify a characteristic of the one or more haptic effects.

3. The system of claim 1, wherein the processor is further configured to execute processor-executable instructions stored in the non-transitory computer-readable medium to identify the haptic track by:
outputting, via a graphical user interface, data indicating the plurality of haptic tracks associated with a plurality of content elements in the content; and
receiving, via the graphical user interface, the selection of the haptic track.

4. The system of claim 1, wherein the processor is further configured to execute processor-executable instructions stored in the non-transitory computer-readable medium to identify of the haptic track by:

determining a distance between the user and the content element in a simulated reality environment; and wherein identifying the haptic track is based on the distance between the user and the content element.

5. The system of claim 1, further comprising:
a sensor communicatively coupled to the processor, wherein the processor is further configured to determine the selection of the content element by:
receiving one or more signals from the sensor; and
in response to determining that a gaze of the user is directed toward the content element based on the one or more signals, selecting the content element.

6. The system of claim 1, wherein the processor is further configured to execute processor-executable instructions stored in the non-transitory computer-readable medium to determine the selection of the content element by:
in response to determining that the user is pointing at the content element of the plurality of content elements, selecting the content element.

7. The system of claim 1, further comprising:
a touch surface;
a sensor communicatively coupled to the processor and the touch surface, the sensor configured to:
detect a pressure associated with a contact on the touch surface; and
transmit one or more signals associated with the pressure,
wherein the processor is further configured to execute processor-executable instructions stored in the non-transitory computer-readable medium to:
receive, from the sensor, the signal associated with the pressure;
determine an amount of pressure based on the one or more signals; and
determine a characteristic of the haptic track based on the amount of pressure.

8. The system of claim 1, wherein the processor is further configured to:
determine a distance between the user and the content element; and
determine a characteristic of the haptic track based on the distance.

9. The system of claim 1, further comprising:
a sensor communicatively coupled to the processor, wherein the processor is further configured to execute processor-executable instructions stored in the non-transitory computer-readable medium to:
receive one or more signals from the sensor;
determine a movement of the user based on the one or more signals; and
determine a characteristic of the haptic track based on the movement of the user.

10. The system of claim 1, further comprising:
a sensor communicatively coupled to the processor, wherein the processor is further configured to execute processor-executable instructions stored in the non-transitory computer-readable medium to:
receive one or more signals from the sensor; and
in response to determining that a gaze of the user is directed toward the content element associated with the haptic track based on the one or more signals, determine a characteristic of the haptic track.

11. The system of claim 1, wherein the processor is further configured to execute processor-executable instructions stored in the non-transitory computer-readable medium to:

use a machine-learning technique to predict a second haptic track based on the identification of the haptic track; and
output a recommendation of the second haptic track.

12. The system of claim 11, wherein the processor is further configured to execute processor-executable instructions stored in the non-transitory computer-readable medium to use the machine-learning technique to predict the second haptic track by:
comparing, using the machine-learning technique, the haptic track and one or more other haptic tracks of the plurality of haptic tracks to determine a similarity between the haptic track and the second haptic track; and
predicting, using the machine-learning technique, the second haptic track based on the similarity between the haptic track and the second haptic track.

13. A method comprising:
obtaining content to be provided to a user;
obtaining data identifying a plurality of haptic tracks associated with a plurality of content elements of the content;
playing, using an output device, a portion of the content;
determining a selection of a content element of the plurality of content elements in the portion of the content;
in response to determining the selection of the content element and while the output device plays the portion of the content:
identifying a haptic track of the plurality of haptic tracks, the haptic track associated with the content element;
determining a haptic effect based on the haptic track;
determining a characteristic of the haptic effect;
transmitting one or more haptic signals to a haptic output device, the one or more haptic signals configured to cause the haptic output device to output the haptic effect based on the characteristic and corresponding to the content element in the portion of the content.

14. The method of claim 13, further comprising modifying a characteristic of the haptic effect.

15. The method of claim 13, wherein identifying the haptic track comprises:
outputting data indicating the plurality of haptic tracks associated with the plurality of content elements in the content; and
receiving the selection of the haptic track.

16. The method of claim 13, wherein identifying the haptic track comprises:
determining a distance between the user and the content element; and
selecting the haptic track of the plurality of haptic tracks based on the distance.

17. The method of claim 13, wherein identifying the haptic track comprises:
receiving a sensor signal from a sensor; and
in response to determining that a gaze of the user is directed toward the content element based on the sensor signal, identifying the haptic track associated with the content element.

18. The method of claim 13, wherein determining the characteristic of the haptic track comprises:
receiving a sensor signal from a sensor, the sensor signal indicating a pressure associated with a contact on a touch surface of a computing device;

determining an amount of pressure based on the sensor signal; and determining the characteristic of the haptic track based on the amount of pressure.

19. The method of claim 13, wherein determining the characteristic of the haptic track comprises:

determining a distance between the user and the content element; and determining the characteristic of the haptic track based on the distance.

20. The method of claim 13, wherein determining the characteristic of the haptic track comprises:

receiving a sensor signal from a sensor, the sensor signal indicating a movement of the user; and determining the characteristic of the haptic track based on the movement of the user.

21. The system of claim 1, wherein the processor is configured to execute processor-executable instructions stored in the non-transitory computer-readable medium to emphasize the one or more haptic effects based on the selection of the content element.

22. The system of claim 1, wherein the processor is configured to execute processor-executable instructions stored in the non-transitory computer-readable medium to deemphasize one or more haptic tracks of the plurality of haptic tracks based on the selection of the content element.

23. The system of claim 1, wherein the processor is configured to execute processor-executable instructions stored in the non-transitory computer-readable medium to disable one or more haptic tracks of the plurality of haptic tracks associated with content elements other than the content element based on the selection of the content element.

* * * * *